No. 714,809. Patented Dec. 2, 1902.
J. H. LEONARD.
NUT LOCK.
(Application filed June 25, 1902.)
(No Model.) 2 Sheets—Sheet 1.
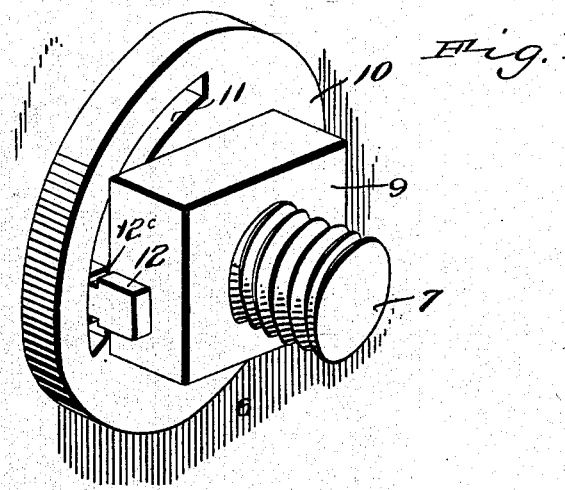
Fig. 1.
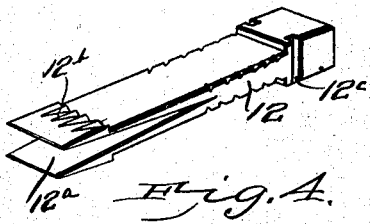
Fig. 4.
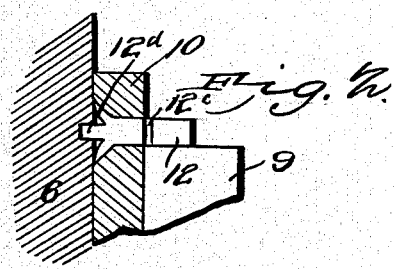
Fig. 2.
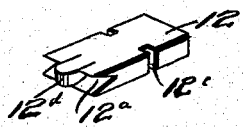
Fig. 5.
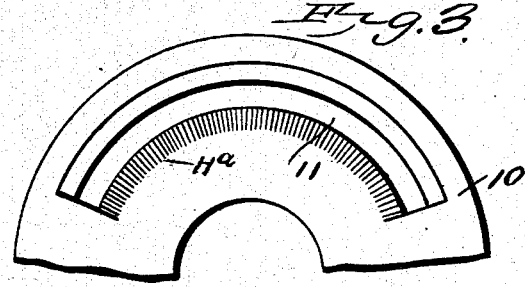
Fig. 3.
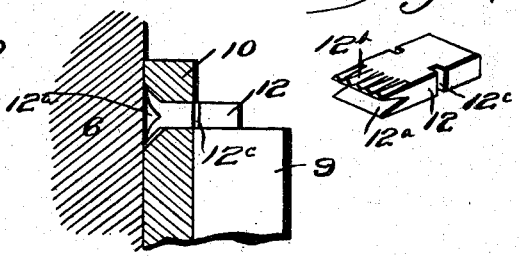
Fig. 6.
Fig. 7.
Witnesses
E. J. Stewart
C. M. Woodward
J. H. Leonard, Inventor.
by C. A. Snow & Co.
Attorneys
THE NORRIS PETERS CO., PHOTO-LITHO., WASHINGTON, D. C.

No. 714,809. Patented Dec. 2, 1902.
J. H. LEONARD.
NUT LOCK.
(Application filed June 25, 1902.)
(No Model.) 2 Sheets—Sheet 2.
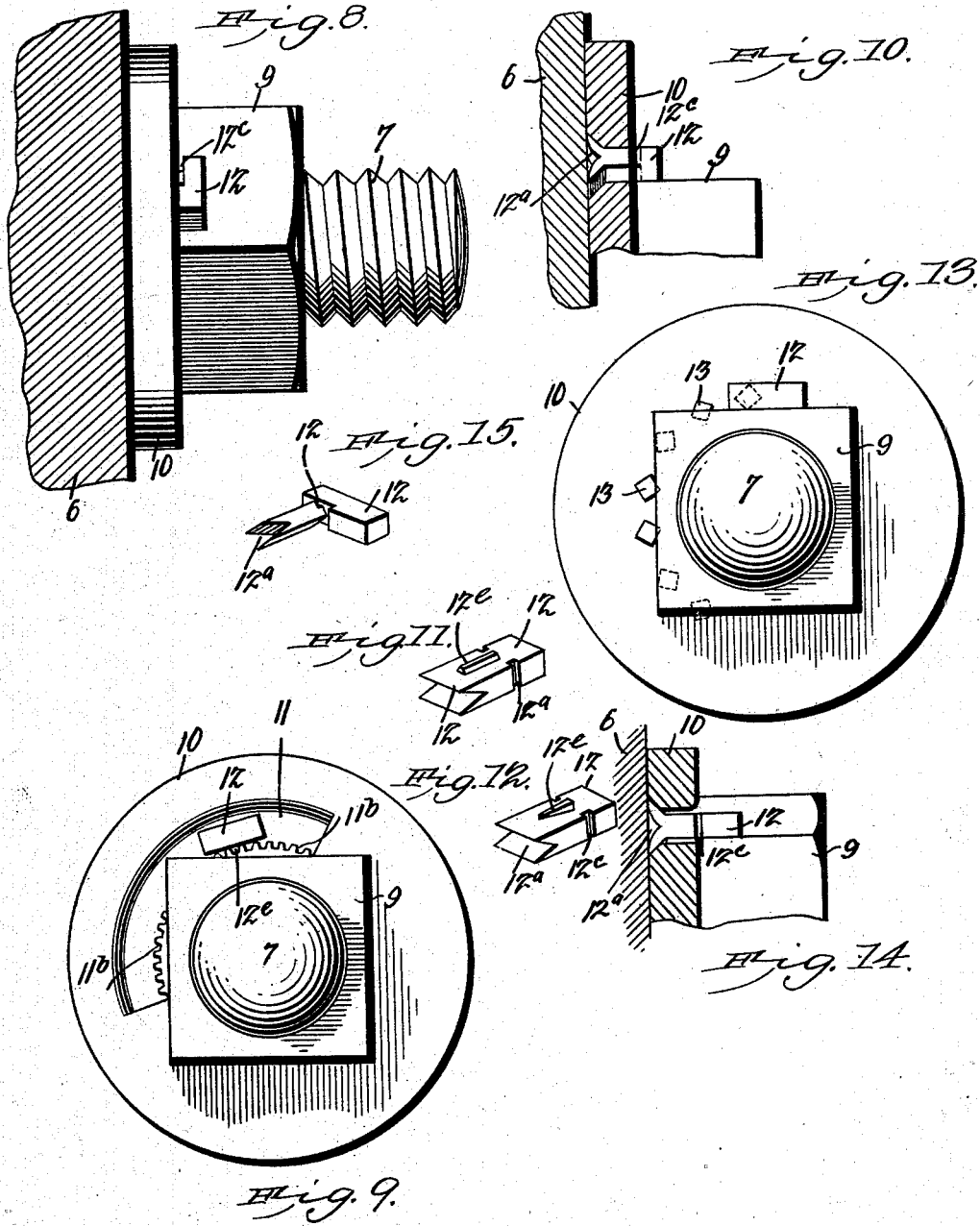
Witnesses
E. F. Stewart
C. N. Woodward
J. H. Leonard, Inventor.
by C. A. Snow & Co.
Attorneys

UNITED STATES PATENT OFFICE.

JOHN HENRY LEONARD, OF WOODLAND, CALIFORNIA.

NUT-LOCK.

SPECIFICATION forming part of Letters Patent No. 714,809, dated December 2, 1902.

Application filed June 25, 1902. Serial No. 113,151. (No model.)

*To all whom it may concern:*

Be it known that I, JOHN HENRY LEONARD, a citizen of the United States, residing at Woodland, in the county of Yolo and State of California, have invented a new and useful Nut-Lock, of which the following is a specification.

This device relates to nut-locks for preventing nuts from running off backward from bolts, more particularly of bolts employed in connecting the parts of agricultural and other machinery which is subjected to a constant jarring motion, and may be employed upon the nuts of bolts connecting metal with metal, metal with wood, or wood with wood, as may be required.

The invention consists in a washer to be inserted beneath the nut and provided with a segmental aperture, with serrations on the under side contiguous to the aperture and a key-plug adapted to engage the aperture and be driven into engagement with the body held by the nut, the key-plug adapted to be expanded or flanged and forcibly engage the serrations on the under side of the washer and the body being held and to project by its outer end into the path of and be engaged by the nut to form a stop to prevent any backward movement of the nut. The key-plug is also provided with one or more recesses to weaken it at the line of the outer surface of the washer to facilitate the breakage of the plug when the nut is to be released.

In the drawings illustrative of the invention, Figure 1 is a perspective view of the device as applied. Fig. 2 is a sectional detail illustrating the operation of the locking plug-key. Fig. 3 is a reverse view of the washer. Fig. 4 is a perspective view of the form of plug-key which will be employed when the device is applied to nuts used upon wood. Fig. 5 is a perspective view of the plug-key as employed in the structure shown in Fig. 2. Fig. 6 is a perspective view illustrating a modification in the form of the plug-key. Fig. 7 is a view similar to Fig. 2, illustrating the operation of the form of plug-key shown in Fig. 6. Fig. 8 is a side view, and Fig. 9 is a plan view, illustrating modifications in some of the details of the construction. Fig. 10 is a sectional detail illustrating the operation of the modifications shown in Figs. 8 and 9. Figs. 11 and 12 are perspective views of the form of key which will be employed in connection with the modifications shown in Figs. 8 and 9. Fig. 13 is a view similar to Fig. 9, illustrating another modification in the construction. Fig. 14 is a sectional detail illustrating the operation of the modification shown in Fig. 13. Fig. 15 is a perspective view of the form of key employed in the modification shown in Figs. 13 and 14.

The body engaged by the bolt and nut is represented at 6, the bolt at 7, and the nut at 9, all of the usual form and construction.

Between the nut 9 and the body 6 is disposed a washer 10, somewhat larger than the largest diameter of the nut and provided with a segmental aperture 11 therethrough. The aperture will be so located that the corners of the nut will project across it when the nut is tightened up, as shown. The diameter of the washer will be in proportion to the diameter of the bolt upon which it is used and it will not be required to form different-sized washers for small variations in diameter of bolt, as one-sized washers may be employed on several sizes of bolt. Thus one-sized washers can be employed on all sizes of bolts ranging between one-half and one inch in diameter and one-sized washers can be employed on bolts ranging from one inch to one inch and a half in diameter, and so on.

The slot or aperture 11 will be long enough so that one of the corners of the nut will at all times project across it, and by elongating this aperture a sufficiently wide range is given to the movement of the nut to provide for its being properly tightened.

The under surface of the washer adjoining the aperture 11 will be chamfered and the chamfered portion serrated, as shown at 11$^a$ in Fig. 3, to assist in locking the clenched key, as hereinafter explained.

The key-plug above referred to is represented at 12 and is formed with a recess or groove 12$^a$ in its lower end, a series of serrations 12$^b$ on one side at its lower end, and one or more recesses 12$^c$ intermediate of its length, as shown.

In operation the washer is placed over the bolt with the chamfered side of the aperture 11 next the body to be held. The nut is then screwed on and tightened up as much as may be required and the key-plug 12 driven into the aperture with its upper end in close engagement with the rear side of the corner of the nut, which for the time being extends across the aperture, and the driving continued until the recesses or grooves 12ᶜ are in alinement with the outer surface of the washer.

The slot 11 should be formed at least one-fourth the circumference of the washer plus the width of the key-plug, so that no matter in what position the nut may be placed one of its corners will at all times project across the slot.

The chamfered and serrated form of the material of the washer adjacent to the aperture 11 and the recessed and serrated lower end of the key-plug coact to cause the key-plug to flange or expand into the transverse triangular aperture caused by the chamfering and serrations and tightly wedge itself in between the washer and the body being held by the bolt and nut, and thus form a very firm "locking" means and coacting with the projecting upper end of the key-plug to effectually hold the washer and nut from turning backward.

In cases where a firmer engagement is required—such as in connection with the bolts used on tumbling-rods, mowing and harvester pitmen, and similar devices where violent agitation of the parts takes place—the key-plug will be formed with a spur $12^d$ on its lower end, as shown in Fig. 5, in addition to the recess $12^a$, and adapted to enter a cavity formed for it in the body portion being held by the bolt. In using this form of key-plug the cavity for the spur $12^d$ will be made either before or after the location of the washer and nut and before the plug is inserted. The stud $12^d$ greatly increases the holding power of the key-plug, but will not be required except in cases, as before mentioned, where very severe jolting or jarring occurs.

The washers may be of any suitable metal and may be of a very hard metal; but the key-plugs should be of a malleable metal, which will enable them to readily "flange" or expand, as above described.

When the nut is to be removed, a blow of a hammer or cold-chisel will sever the key-plug at the line of the weakening-grooves $12^c$ and release the nut, which may then be turned backward and removed from the bolt. The washer is at the same time released, and the stump of the key-plug remaining in the aperture can then be readily driven out, when the washer is again ready for use by providing a new key-plug. The key-plugs can be furnished at very slight expense, thus enabling the more expensive washers to be used repeatedly.

When used to hold the nut upon wood, the key-plug will be longer and with the recess $12^a$ correspondingly longer, so that when driven through the aperture 11 it will enter the wood and the two parts of the key-plug spread apart by the portion of wood which comes between them and turned off at either side and "clenched" in the wood.

It will be noted by reference to Fig. 4 that the lower or bifurcated end of the key-plug 12 is enlarged, so that when driven into the wood it expands it laterally, and then the elasticity of the wood causes it to return into the cavity around the shank of the plug and tightly compresses it and effectually prevents the withdrawal of the plug.

When employed to lock the nuts upon railway-rail joints and in similar localities where the nuts and the parts held by them are subjected to very severe jarring and concussion, the modifications shown in Figs. 8 to 12 will be employed. These modifications consist in forming serrations in the inner vertical wall of the slot 11, as indicated at $11^b$, and with a tongue $12^e$ upon the key 12 to engage the serrations, as shown in Fig. 9. This greatly increases the "grip" of the key and insures the more firm holding of the parts in engagement and effectually resists any tendency to their working loose under severe concussion or jarring.

The tongue $12^e$ may be wedge-shaped, as shown in Fig. 12, if preferred, to cause it to be "wedged" into the serration $11^b$.

In Fig. 14 the slot 11 is shown replaced by a series of concentrically-disposed apertures 13, each having a countersunk lower end next the body 6 and preferably with the serrations in the countersunk portion similar to those shown in Fig. 3, against which the bifurcated end of the key flanges in the same manner as in the other modifications shown. In this modification the key 12 will be connected to the head or portion projecting above the washer and in engagement with the nut at an angle thereto to enable the "head" to engage the nut, as shown in Figs. 13 and 14. All these different modifications, however, are merely colorable changes and all produce the same effect in substantially the same manner and are not, therefore, a departure from the spirit of the invention, and their use does not effect the scope of the invention or sacrifice any of its advantages.

Having thus fully described my invention, what I claim as new, and desire to secure by Letters Patent, is—

1. A nut-lock comprising a washer having an aperture across which the nut is disposed to extend, a key-plug adapted to be forced into said aperture in the rear of said nut, and means whereby the inner end of said key-plug will be caused to expand between the washer and the body being held by the bolt and nut and thereby form a locking means to the nut, substantially as described.

2. A nut-lock comprising a washer having an elongated aperture across which the nut is disposed to extend and with the edges of the aperture chamfered next the body being held, a key-plug adapted to be forced into said aperture in the rear of said nut, and means whereby the inner end of said key-plug will be expanded into the cavity formed by said chamfering and in engagement with said body being held, substantially as described.

3. A nut-lock comprising a washer having an aperture therethrough across which the nut is disposed to extend and with the edges of the aperture chamfered next the body being held, and provided with serrations upon the chamfered surface, a key-plug having a recess in its inner end and adapted to be forced through said aperture in the rear of said nut, whereby the inner end of said plug is caused to be expanded into the cavities formed by said chamfering and serrations, and in engagement with the said body being held, and form a locking means to said washer and nut, substantially as described.

4. A nut-lock comprising a washer having an aperture across which the nut is disposed to extend, a key-plug adapted to be forced through said aperture and its inner end caused to be expanded between said washer and the body being held and with its outer end projecting in the rear of said nut, said key-plug having weakening-grooves at the line of the outer surface of said washer, whereby means are provided for locking said washer and nut in engagement with the body being held and for releasing said nut when required, substantially as described.

5. A nut-lock comprising a washer having an aperture across which the nut is disposed to extend and with serrations engaging said aperture, a key-plug adapted to be forced into said aperture in the rear of said nut and with means carried by said key-plug for engaging said serrations, and means whereby said key-plug will be caused to expand between said washer and the body being held, substantially as described.

In testimony that I claim the foregoing as my own I have hereto affixed my signature in the presence of two witnesses.

JOHN HENRY LEONARD.

Witnesses:
W. C. GWINN,
PAUL W. SALOMON.